United States Patent [19]

Van de Caveye

[11] 4,332,540

[45] Jun. 1, 1982

[54] PRESS FOR MOULDING CONCRETE PRODUCTS

[75] Inventor: Yves H. Van de Caveye, Beauvais, France

[73] Assignee: Societe D'Exploitation des Etablissements Minato, France

[21] Appl. No.: 165,032

[22] Filed: Jul. 1, 1980

[30] Foreign Application Priority Data

Jul. 27, 1979 [FR] France .............................. 79 19461

[51] Int. Cl.3 .......................... B28B 1/08; B29C 1/16; B28B 3/02; B28B 7/22

[52] U.S. Cl. .................................... 425/182; 425/253; 425/413; 425/421; 425/432; 425/452; 425/454; 425/456

[58] Field of Search ................ 249/117, 139; 425/413, 425/432, 452, 453, 456, DIG. 117, DIG. 118, 424, 421, 253, 254, 454; 264/69, 71, 72

[56] References Cited

U.S. PATENT DOCUMENTS

| | | | |
|---|---|---|---|
| 1,595,255 | 8/1926 | Smith | 425/432 |
| 2,342,440 | 2/1944 | Whitsitt | 25/41 |
| 3,530,554 | 9/1970 | Whitehurst | 425/432 |
| 3,660,004 | 5/1972 | Woelk | 425/432 |
| 3,679,340 | 7/1972 | Springs | 425/432 |
| 3,920,364 | 11/1975 | Cadogan-Rawlinson | 425/450.1 |
| 4,238,177 | 12/1980 | Crile et al. | 425/432 |
| 4,248,583 | 2/1981 | Hedke et al. | 425/450.1 |

FOREIGN PATENT DOCUMENTS

| | | |
|---|---|---|
| 1033578 | 3/1958 | Fed. Rep. of Germany . |
| 995074 | 11/1951 | France . |
| 1506377 | 12/1967 | France . |
| 2324426 | 4/1974 | France . |
| 558907 | 1/1944 | United Kingdom . |

*Primary Examiner*—Willard E. Hoag
*Attorney, Agent, or Firm*—Steinberg & Raskin

[57] ABSTRACT

A press for moulding concrete products has a frame, a horizontal vibrating table, a board and a mould movable vertically between a demoulding upper position and a moulding lower position. A displacing device moves and selectively rigidly connects the mould to the table during vibration of concrete in the mould in a manner whereby the mould, the board and the table form a rigid unit subjected to vibration. The connecting device includes fixing legs attached to the mould and pairs of grippers for symmetrically selectively clamping the lower ends of the fixing legs.

9 Claims, 2 Drawing Figures

PRESS FOR MOULDING CONCRETE PRODUCTS

BACKGROUND OF THE INVENTION

The present invention relates generally to moulding presses. More particularly, the invention relates to a press for moulding concrete products such as, for example, concrete blocks, by subjecting concrete to a vibrating operation.

There are already known, in the prior art, presses for moulding concrete products. Such presses usually comprise a frame, a horizontal vibrating table supported by a vertical-action unidirectional vibrating device, a system for supplying boards one by one onto the vibrating table, a mould displaceable vertically by means of hydraulic actuators, each actuator having its own piston attached to the mould and its cylinder attached to the frame, and a concrete feeding system.

However, a press for moulding concrete products of the type described has drawbacks. Indeed, during the stage of vibration of the concrete in the mould, impacts of the vibrating table occur in the board and therefore in the mould pressed on the board. Under such conditions, the hydraulic actuators serving to press the mould on the board support the impacts and transmit them to the frame. Thus, such a transmission of the impacts is noisy and brings about mechanical destruction. This results in considerable power consumption and in a low efficiency of the moulding press.

SUMMARY OF THE INVENTION

The principal object of the invention is to provide a press for moulding concrete products, which press overcomes the drawbacks of known presses and functions efficiently, effectively and with very great reliability.

The press of the invention for moulding concrete products comprises a frame and a horizontal vibrating table supported by a vertical-action unidirectional vibrating device. A system supplies boards, one by one, onto the vibrating table. A mould is vertically displaceable between a demoulding higher position and a moulding lower position, in which it is pressed on the board. A concrete feeding system feeds concrete to the mould. In accordance with the invention, the press comprises connecting means for fastening the mould to the vibrating table during the vibration of concrete in the mould, the board then being clamped between the mould and the table, whereby the mould, the board and the table together form a rigid unit assembly subjected to vibration.

It is thus understood that during the vibration of the concrete in the mould, the use of the connecting means for fastening the mould to the vibrating table completely prevents the transmission of impacts from the vibrating table to the mould. Consequently, there is no transmission of impacts to the frame, and on the other hand, the hydraulic actuators attached to the frame and to the mould no longer serve to press the mould to the vibrating table. Furthermore, a better distribution of the vibrations and a 40 to 50% saving of power are obtained.

In accordance with another feature of the invention, the connecting or fastening means comprises fixing legs integral with or attached to the mould and extending towards the vibrating table and grippers or jaws for clamping the lower ends of the fixing legs. Actuating means selectively open and close the jaws. Displacing means moves the mould to the vibrating table with a predetermined force.

In accordance with still another feature of the invention, the displacing means comprises means for drawing or pushing the supports of the jaws relative to the vibrating table when the lower ends of the fixing legs are clamped between the jaws.

BRIEF DESCRIPTION OF THE DRAWINGS

For a fuller understanding of the invention, reference is had to the following description taken in connection with the accompanying drawings, in which.

DESCRIPTION OF PREFERRED EMBODIMENTS

Figure 1:
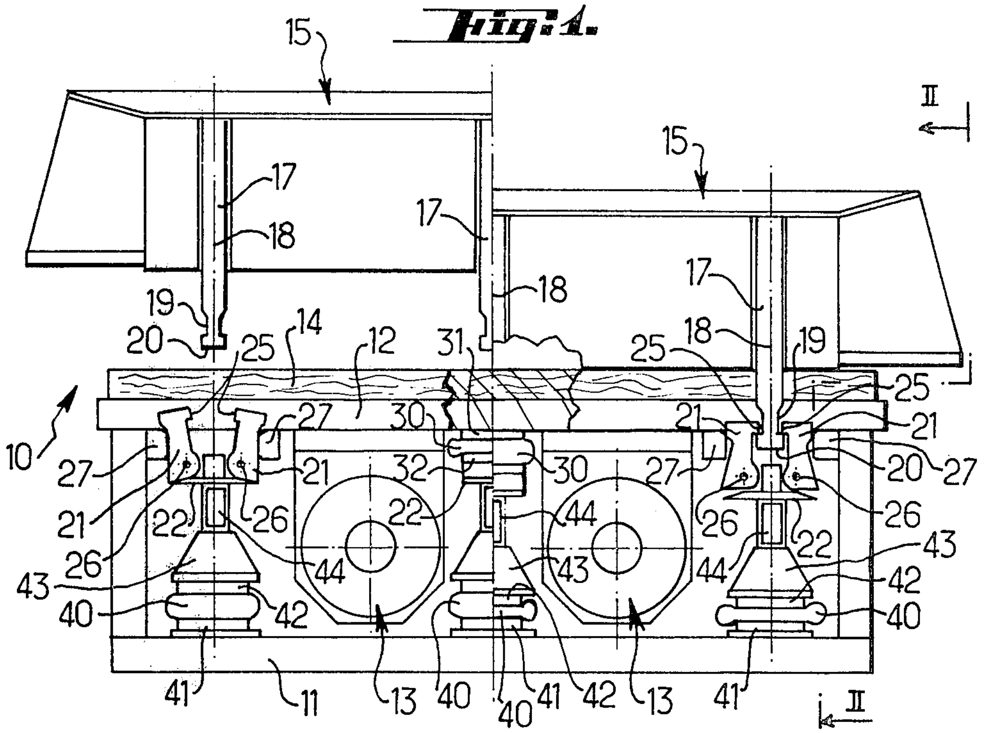
FIG. 1 is a front elevational view, partly cut away and partly in section, of an embodiment of the moulding press of the invention, the right portion of the FIG. representing the mould in moulding position and the left portion of the FIG. showing the mould in the demoulding position.
Figure 2:
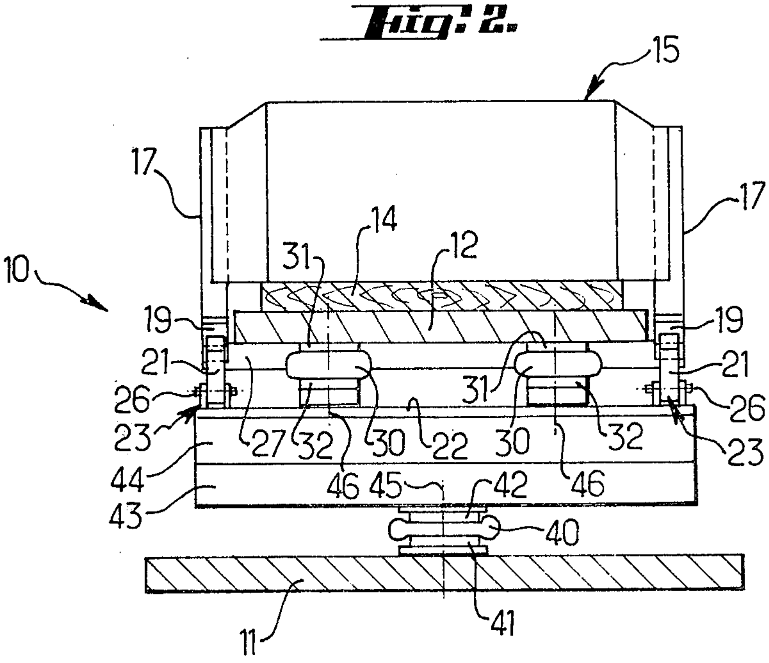
FIG. 2 is a sectional view, taken along the lines II—II, FIG. 1, the mould being in the moulding position.

In an example of a preferred embodiment of the invention, as shown in FIGS. 1 and 2, a press 10 for moulding concrete products, such as, for example, concrete blocks, comprises a frame 11 (represented partially) and a horizontal vibrating table 12 supported by a vertical-action unidirectional vibrating device constituted, for example, by two vibrators 13 of known type. The moulding press 10 is supplied with boards, or the like, 14 of wood, or any other material, by an appropriate system 14 for supplying the boards, one by one, onto the vibrating table 12. Furthermore, the press 10 is supplied in a conventional manner with concrete by appropriate means.

In FIG. 1, a mould 15 is shown broken up into two half-moulds in order to illustrate said mould in the moulding position in the right part of FIG. 1, and said mould in the demoulding position in the left part of FIG. 1. Of course, the mould 15 is designed to permit a certain number of concrete products to be moulded at the same time. The mould 15 is displaceable vertically between a demoulding upper position (left portion of FIG. 1) and a moulding lower position in which it is pressed against the board 14 (right portion of FIG. 1) under the action of one or more hydraulic actuators (not shown in the FIGS.) whose piston is attached to the mould and whose cylinder or body is attached to the frame. As hereinafter described, the hydraulic actuators are no longer used for pressing the mould 15 against the vibrating table 12.

The mould 15 is substantially parallelepipedic in shape and has two spaced opposite faces or surfaces, each provided externally with three fixing or catching legs 17, each having an axis of symmetry 18. The fixing legs 17 are uniformly distributed along the length of the mould 15, so the mould has three pairs of legs 17. And, as clearly shown in FIG. 2, two legs 17 of a same pair. Furthermore, as clearly illustrated in FIG. 2, the distance separating the two legs 17 of a same pair is slightly greater than the width of the vibrating table 12. The catching legs 17 extend towards the vibrating table 12 and their length is greater than the height of the mould. Furthermore, the lower end or portion 20 of each catching leg 17 is provided with a bore 19 whose function is hereinafter described.

The lower end 20 of each leg 17 is adapted to be clamped between two jaws or grippers 21 when the mould 15 is in the moulding position. Thus, six pairs of jaws 21 are provided for clamping the lower ends 20 of the six legs 17. Every two pairs of jaws 21, corresponding to each pair of legs 17, are assembled on a support plate 22 via hinge means 23 (FIG. 2). Consequently, there are three support plates 22 for the three pairs of legs 17 and two pairs of jaws 21 per plate 22.

Each jaw 21 of a same pair includes a protruding portion 25 adapted to enter the bore or recess 19 of the corresponding leg 17 when the leg-and-jaws assembly is in the locking position. It will be noted in this connection that the leg-jaws assembly may be replaced by any other appropriate locking device without departing from the scope of the invention.

It is thus clear that during the stage of vibration of the concrete in the mould 15, said mould is fastened to the vibrating table 12, the board 14 thus being clamped between said mould and said table so that said mould, said board and said table together form a rigid unit assembly subjected to vibration.

Furthermore, each jaw 21 has a hinge pin 26 that is slightly shifted with respect to the axis of symmetry of the jaw. More precisely, the hinge pin 26 is located in the lower portion of the jaw 21, between the axis of symmetry of said jaw and the axis 18 of the leg 17. Furthermore, six stops 27 are affixed to the underside of the vibrating table 12 and cooperate with two jaws 21, respectively, pertaining to two pairs of jaws associated with the same support plate 22.

As clearly shown in FIG. 2, a pair of bellows-type pneumatic actuators 30 fed with compressed air are mounted between each support plate 22 and the table 12. Each bellows-type actuator 30 includes an upper flange 31 secured to the vibrating table 12 and a lower flange 32 secured to the corresponding support plate 22. In all, therefore, there are six bellows-type pneumatic actuators 30 mounted two by two on a support plate 22. The two bellows-type actuators 30 of the same pair are so arranged as to ensure the equilibrium of the vibrating table 12.

As shown in FIGS. 1 and 2, each support plate 22 is connected to the base of the frame 11 via a rigid connection and a single bellows-type pneumatic actuator 40 supplied with compressed air in an opposite direction to the two bellows-type actuators 30 associated with said plate. There are therefore three bellows-type pneumatic actuators 40, each actuator 40 being associated with a pair of actuators 30. More precisely, each bellows-type actuator 40 includes a lower flange 41 secured to the base of the frame 11 and an upper flange 42 secured to a rigid connection constituted by two beam members 43 and 44, the member 44 being integral with, or rigidly attached to, the corresponding support plate 22. Furthermore, the hinge pin 45 of each bellows-type actuator 40 is located exactly at the middle of the distance separating the hinge pins 46 of the two bellows-type actuators 30 of the same pair (FIG. 2).

The aforedescribed bellows-type pneumatic actuators 30 and 40, which provide a connection between the vibrating table and the base of the frame 11, simultaneously serve as actuating means for opening and closing the jaws 21, and as displacing means for moving the mould 15 onto the vibrating table 12 by pulling it downwards with a predetermined force. More particularly, the bellows-type actuators 30 and 40 constitute means for pulling or pushing the support plates 22 of the jaws 21 relative to the vibrating table 12 when the lower ends 20 of the legs 17 are clamped between said jaws.

The operation and use of the moulding press of the invention may be deduced from the foregoing description and are explained as follows.

Assuming, for example, that the situation is as shown in the left portion of FIG. 1. That is, the mould 15 is in its demoulding position, a board 14 is placed on the vibrating table 12, the three bellows-type actuators 40 are inflated, and the six bellows-type actuators 30 are deflated. The jaws 21 are thus open.

In order to pass from the demoulding position represented in the left portion of FIG. 1 to the moulding position shown in the right portion of said FIG., the hydraulic actuators, attached, on the one hand, to the upper portion of the mould 15, and the other hand, to the frame, lower the mould so that the lower end 20 of each leg 17 enters the space between the two corresponding jaws 21. At that moment, the three bellows-type actuators 40 are deflated and the six belllows-type actuators 30 are inflated simultaneously. This causes the three support plates 22 of the jaws 21 to move downwards, and the jaws cooperating with the stops 27 to swing, so that each pair of said jaws clamps each leg 17 by means of their projections 25 entering the bore or recesses 19 of the legs 17. Under such conditions, the mould 15 is moved onto the vibrating table 12 with a predetermined force. The feeding of the hydraulic actuators attached to the upper portion of the mould may then be cut off.

Thereafter, the concrete is supplied to the mould 15 and the vibration of the concrete in the mould, permitting the concrete to be compacted, begins. During the vibration, the mould 15, the board 14 and the vibrating table 12 together form a rigid unit assembly subjected to vibration. The vibrations are perfectly sinusoidal and of a given frequency such as, for example, between 50 and 200 c.p.s., and of adjustable amplitude, from 0.2 or 0.3 to 3 mm, depending upon the out-of-balance weights used on the vibrators 13.

During the vibration of the concrete in the mould, the hydraulic actuators no longer fulfil the function of keeping the mould pressed on the board-and-vibrating table assembly and may therefore be fixed quite flexibly, and thus offer the advantage of no longer imparting vibrations to the frame. On the other hand, the three bellows-type actuators are then deflated, so that they prevent the transmission of any vibration to the table at the base of the frame 11.

When the filling of the mould is completed, a rammer places the products strictly at the desired height.

Thereafter, demoulding is performed by simultaneously inflating the three bellows-type actuators 40 and deflating the six bellows-type actuators 30. This results in raising the three plates 22 supporting the jaws 21 and in opening the jaws operating with the stops 27. Under such conditions, the refed hydraulic actuators attached to the mould 15 and to the frame raise the assembly constituted by said mould and the legs 17. Thereafter, the board 14 supporting the moulded concrete products is withdrawn from the press 10 by appropriate means. Another board 14 is thereafter moved onto the vibrating table 12, and the moulding and demoulding operations are carried out as hereinbefore described.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. A press for moulding concrete products, said press comprising a frame having a base;

a substantially horizontal vibrating table supported by a vertical action unidirectional vibrating device;

means for supplying boards, one by one, onto said table;

a mould movable vertically between a demoulding upper position and a moulding lower position in which said mould is pressed on one of said boards, said mould having lateral surfaces;

a concrete feeding means for feeding concrete to said mould;

connecting means for rigidly connecting said mould to said table during vibration of concrete in said mould, in a manner whereby said mould, said board and said table form a rigid unit assembly subjected to vibration; and displacing means for moving said mould onto said table with a predetermined force, said displacing means being mounted between said table and the base of said frame thereby preventing transmission of any vibration from said table to said frame during vibration or said concrete, said connecting means comprising fixing legs on said mould, extending toward said table and distributed on the lateral surfaces of said mould in a manner whereby said mould is uniformly moved to and seated on the entire surface of said table, clamping means for clamping the lower end of each of said fixing legs, said clamping means being supported by said displacing means, and actuating means for selective clamping and unclamping said clamping means.

2. A press as claimed in claim 1, wherein said displacing means vertically displaces, relative to said table, said clamping means when the lower ends of said fixing legs are clamped by said clamping means, said displacing means comprising at least one group of bellows-type pneumatic actuators superposed on one another and supplied with fluid in opposite directions to each other in a manner whereby a lower one of said actuators is empty during vibration of said concrete.

3. A press as claimed in claim 1, wherein said clamping means comprises pairs of grippers for symmetrically clamping the lower ends of said fixing legs and supports supporting said pairs of grippers.

4. A press as claimed in claim 3, wherein said frame comprises stationary stops cooperating with the grippers of said clamping means to selectively open and close said grippers when said actuating means move beyond the supports of said grippers upward and downward, respectively, relative to said table.

5. A press as claimed in claim 1, wherein said mould has spaced opposite surfaces and a medial vertical longitudinal plane and said fixing legs are secured to said opposite surfaces of said mould in symmetrical pairs relative to said medial vertical longitudinal plane.

6. A press as claimed in claim 5, wherein said fixing legs are in three pairs.

7. A press as claimed in claim 5, wherein said mould has a lower surface and said fixing legs on said mould are directed downwardly of said mould and extend substantially vertically downward from said surfaces of said mould to below said lower surface of said mould, and the lower end of each fixing leg has a configuration for engaging with said clamping means, said fixing legs selectively temporarily rigidly connecting said mould to said table.

8. A press as claimed in claim 1, wherein said mould has spaced opposite surfaces and a medial vertical longitudinal plane and said fixing legs being integral with said opposite surfaces of said mould in symmetrical pairs relative to said medial vertical longitudinal plane.

9. A press as claimed in claim 8, wherein said fixing legs are in three pairs.

* * * * *

UNITED STATES PATENT AND TRADEMARK OFFICE

CERTIFICATE OF CORRECTION

PATENT NO. : 4,332,540

DATED : June 1, 1982

INVENTOR(S) : Yves H. Van de Caveye

It is certified that error appears in the above—identified patent and that said Letters Patent is hereby corrected as shown below:

On the title page correct item [73] to read:

-- [73] Assignee: SO.DE.EM. SOCIETE D'EXPLOITATION DES ETABLISSEMENTS MINATO --.

Signed and Sealed this

*Eighth* Day of *March 1983*

[SEAL]

*Attest:*

GERALD J. MOSSINGHOFF

*Attesting Officer* *Commissioner of Patents and Trademarks*